United States Patent
Fienblit et al.

(10) Patent No.: US 9,208,192 B2
(45) Date of Patent: Dec. 8, 2015

(54) CONDITIONAL STORAGE OF MULTIPLE INFORMATION ITEMS

(75) Inventors: Shachar Fienblit, Ein Ayala (IL); Itzhack Goldberg, Hadera (IL); Eli Malul, Tirat Carmel (IL); Amir Sasson, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 1066 days.

(21) Appl. No.: 12/398,339

(22) Filed: Mar. 5, 2009

(65) Prior Publication Data
US 2010/0228935 A1   Sep. 9, 2010

(51) Int. Cl.
*G06F 7/00* (2006.01)
*G06F 17/30* (2006.01)

(52) U.S. Cl.
CPC ...... *G06F 17/30371* (2013.01); *G06F 17/3015* (2013.01); *G06F 17/30079* (2013.01)

(58) Field of Classification Search
None
See application file for complete search history.

(56) References Cited

U.S. PATENT DOCUMENTS

| | | | | |
|---|---|---|---|---|
| 5,937,414 A | * | 8/1999 | Souder et al. | 707/616 |
| 7,069,402 B2 | | 6/2006 | Coulter et al. | |
| 7,191,299 B1 | * | 3/2007 | Kekre et al. | 711/162 |
| 7,277,997 B2 | | 10/2007 | Vincent | |
| 7,330,997 B1 | * | 2/2008 | Odom | 714/6.23 |
| 7,403,960 B2 | * | 7/2008 | Kodama | 707/639 |
| 7,958,393 B2 | * | 6/2011 | Bobak et al. | 714/15 |
| 2005/0038827 A1 | * | 2/2005 | Hooks | 707/200 |
| 2007/0022129 A1 | * | 1/2007 | Bahar et al. | 707/100 |
| 2009/0158080 A1 | * | 6/2009 | Furuya et al. | 714/2 |
| 2010/0145909 A1 | * | 6/2010 | Ngo | 707/611 |

OTHER PUBLICATIONS

Brodsky et al., "Policy Driven Replication", Thesis, The University of British Columbia, 2005.*

* cited by examiner

*Primary Examiner* — Michael Hicks
(74) *Attorney, Agent, or Firm* — Zilka-Kotab, PC

(57) ABSTRACT

A method for consistent version of multiple information items is provided. The method includes receiving a conditional request to copy a version of multiple information items at a condition fulfillment point of time that is associated with a fulfillment of a condition of the conditional request. Then determining that the condition is fulfilled, and participating in generating a condition fulfillment point in time version of the multiple information items.

19 Claims, 3 Drawing Sheets

Determining that the condition is fulfilled when receiving a request to write to a memory space that stores an information item, out of the multiple information items, that was read after receiving the conditional request. 121

Determining that the condition is fulfilled when receiving an application coherency indication. 122

Determining that the condition is fulfilled when detecting a potential hazard. 123

Determining that the condition is fulfilled when a memory entity selected from a source memory entity and a target memory entity is capable of participating in generating the condition fulfillment point in time version of the multiple information items. 124

Determining that the condition is fulfilled in response to a cost associated with a generation of a condition fulfillment point in time version of the multiple information items. 126

Determining, by a storage controller, that the condition is fulfilled in response to a value of at least one parameter that is detected by the storage controller or received by the storage controller 127

CONDITIONAL STORAGE OF MULTIPLE INFORMATION ITEMS

BACKGROUND OF THE INVENTION

1. Field of the Invention

The present invention relates to methods, systems and computer program products for conditional storage of multiple information items.

2. Background Information

Data protection techniques include generating snap-shots, also referred to as flash-copies or point in time versions, of information items. These snap-shots are copies of the versions of the information items as they were when a request to generate a snap shot is received, regardless of other parameters such as cost of copy and so forth.

A snap-shot usually involves copying a version of an information item that is stored at a source memory entity (such as a memory unit, a storage unit, a cache memory and the like) to a target memory entity.

Accordingly, there is a clearly-felt need in the art to provide devices, computer program products and methods for copying information items.

SUMMARY OF THE INVENTION

In one embodiment, method for consistent version of multiple information items is provided. The method includes receiving a conditional request to copy a version of multiple information items at a condition fulfillment point of time that is associated with a fulfillment of a condition of the conditional request; determining that the condition is fulfilled; and participating in generating a condition fulfillment point in time version of the multiple information items.

Other, advantages and embodiments of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the invention, as well as a preferred mode of use, reference should be made to the following detailed description read in conjunction with the accompanying drawings, in which:

FIG. 2 illustrates a stage of determining a fulfillment of a condition, according to an embodiment of the invention.

DESCRIPTION OF THE PREFERRED EMBODIMENTS

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a", "an", and "the" include plural referents unless otherwise specified.

The method, computer program product and system illustrated below can generate a condition fulfillment point in time copy (also referred to as conditional fulfillment snap shot) of multiple information items. Such a snap shot can be generated once one or more conditions are fulfilled. The one or more condition is expected to be fulfilled after receiving a conditional request to generate such a snap shot.

Timing constraints relating to the generation of the condition fulfillment snap-shot are relaxed and data consistency is guaranteed at a point of time that follows the reception of a conditional request to generate the condition fulfillment snap-shot. By delaying the generation of the snap-shot the number of redundant writes from the source memory entity (also referred to as a primary storage entity) to the target memory entity (also referred to as a secondary storage entity) are reduced. For example—if a snap-shot relationship is established (for example—in preparation for a backup) and later is abandoned without actually doing such a backup, information items are not copied from the source memory entity to the target memory entity.

Figure 1:
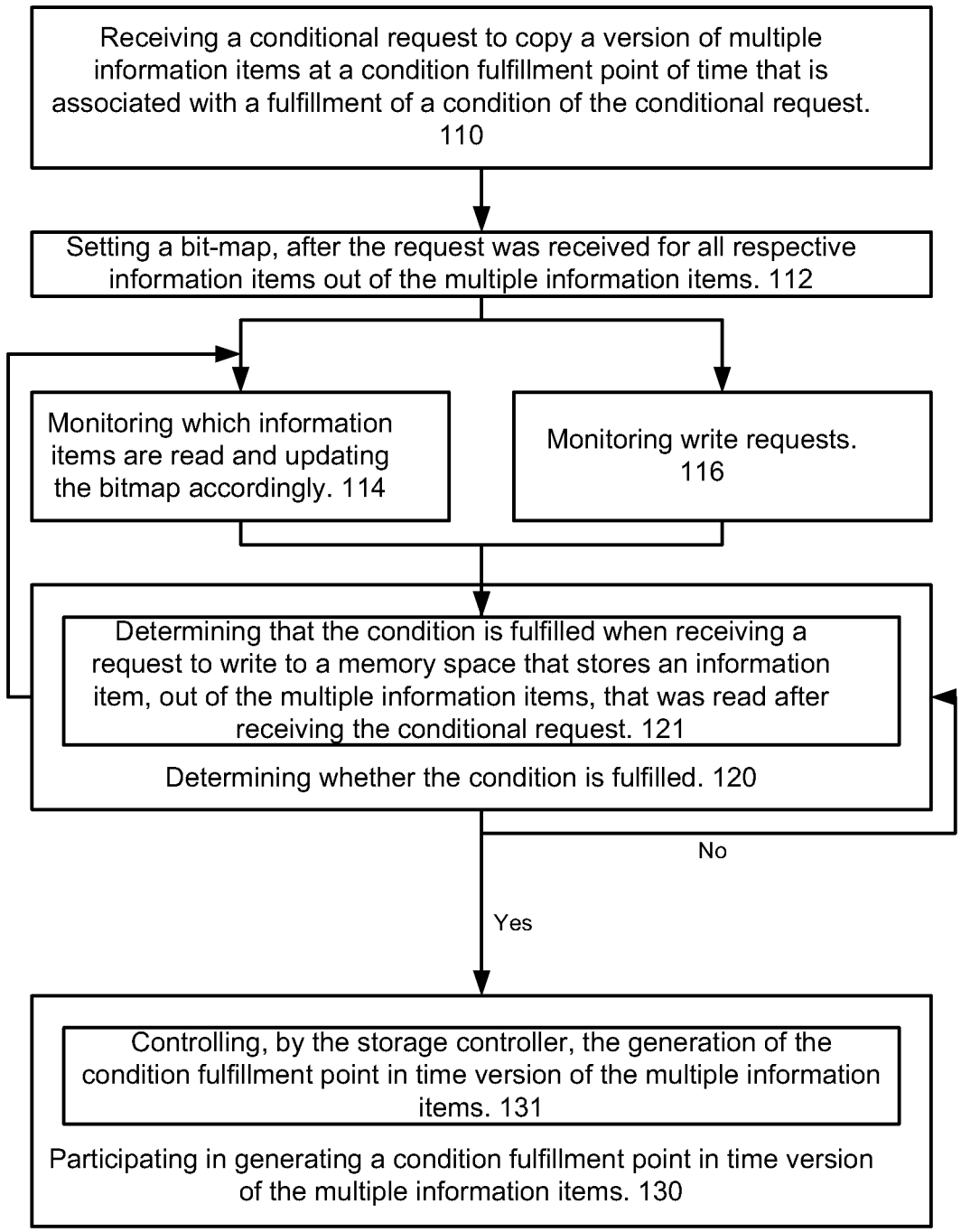
FIG. 1 illustrates a method according to an embodiment of the invention.

FIG. 1 illustrates method 100 according to an embodiment of the invention. Method 100 starts by stage 110 of receiving a conditional request to copy a version of multiple information items at a condition fulfillment point of time. The condition fulfillment point in time is responsive to a time in which one or more conditions (associated with the conditional request) are fulfilled. Stage 110 can include establishing a snap shot relationship.

It is noted that the conditional request can define the identity of the multiple information items. It is noted that this is not necessarily so and that the identity of these information items can be determined in advance or by other means.

The conditional request indicates the memory spaces that store the multiple information items. The conditional request can define virtual memory spaces, physical memory spaces, memory blocks, continuous memory spaces, non-continuous memory spaces, logical partitions, logical volumes, physical partitions, physical volumes, and the like.

Stage 110 is followed by stage 120 of determining whether the condition is fulfilled. Stage 120 is repeated until the condition is fulfilled and once it is fulfilled the method continues to stage 130.

The conditional request can include (or otherwise associated with) multiple conditions. The condition fulfillment point can occur when one or more (even all) conditions are fulfilled. Various relationships between these multiple conditions can be fulfilled. One condition can be mandatory while another can be optional. Examples of relationships can include "or", "and", "xor", "n out of m", and the like. A mandatory condition can be a condition that guarantees a consistency of the versions of the multiple information items.

Stage 120 can include at least one of the following or a combination thereof, all being illustrated in FIG. 2: (i) Stage 121 of determining that the condition is fulfilled when receiving a request to write to a memory space that stores an information item, out of the multiple information items, that was read after receiving the conditional request; the memory space can belong to a source memory entity and the read operation was directed to the target memory entity but was redirected to the source memory entity; (ii) stage 122 of determining that the condition is fulfilled when receiving an application coherency indication; (iii) stage 123 of determining that the condition is fulfilled when detecting a potential hazard; (iv) stage 124 of determining that the condition is fulfilled when a memory entity selected from a source memory entity and a target memory entity is capable of participating in generating the condition fulfillment point in time version of the multiple information items; (v) stage 125 of determining that the condition is fulfilled in response to a load of a component that participates in a generation of a condition fulfillment point in time version of the multiple information items; (vi) stage 126 of determining that the condition is fulfilled in response to a cost associated with a generation of a condition fulfillment point in time version of the multiple information items; and/or (vii) stage 127 of determining, by a storage controller, that the condition is fulfilled in response to a value of at least one parameter that is detected by the storage controller or received by the storage controller; and controlling, by the storage controller, the generation of the condition fulfillment point in time version of the multiple information items (also referred to as condition fulfillment snap shot).

Conveniently, stage 110 is followed by stage 112 of setting a bit-map, after the request was received (at point in time TIME) for all respective information items out of the multiple information items. Stage 112 is followed by stages 114 and 116. Stage 114 includes monitoring which information items are read and updating the bitmap accordingly. Stage 114 can include monitoring read requests that were directed to a target memory entity and were re-directed to the source memory entity. Stage 116 includes monitoring write requests. The write requests are directed to the source memory entity. Stage 114 and 116 are followed by stage 121 of determining that a condition is fulfilled when receiving a write request (at point in time TIME+DELTA) that is aimed to a memory space that stores an information item that was read after TIME. Accordingly, point in time TIME+DELTA can be the condition fulfillment point in time and a version of the multiple information items at TIME+DELTA is generated.

In order to maintain consistency that same version of each information item should be provided in response to a read operation that occurs after TIME. Thus, read requests to an information item that is stored in the target memory unit can be re-directed to the source memory unit as long as the version of the information item at the source memory unit is not modified—is not written. If memory spaces that do not store relevant information items (information items out of the multiple information items) are written—there if no need to jump to stage 130 and generate a condition fulfillment point in time version of the multiple information items.

Stage 121 delimits a time window during which another condition can be examined for fulfillment as it maintains the consistency of the versions of the multiple information items. Thus, between TIME and TIME+DELTA at least one other condition can be monitored for fulfillment and if fulfilled then it will be the condition fulfillment point in time. During this time window any stage out stages 122, 123, 124, 125, 126 and 127 can be examined.

Conveniently, the cost of generating a condition fulfillment snap shot depends upon various parameters such as the time of transfer (especially when communication channel fees are time dependent), required temporal bandwidth (large and frequent bursts can be more costly as they require more bandwidth), and the like. A cost function can be calculated and when it reaches a predefined value then the condition can be fulfilled. It is noted that the cost function can be responsive to load and performance related parameters.

It is noted that the condition can be fulfilled if any of the following events occur: (i) A load on the target memory entity, source memory entity, a storage controller or any link or resource that participates in the generation of the condition fulfillment snap shot is below a threshold, reaches an optimal or minimal level and, additionally or alternatively, at least one of these resources was not capable of participating in generating a snap shot; (ii) A condition fulfillment point in time is defined in the conditional request and at least one of the mentioned above resources was not capable of participating in a snap shot; (iii) Detecting an application consistency point (for example—a consistency point of a database application) and at least one of the mentioned above resources was not capable of participating in a snap shot; and/or (iv) Detecting a potential hazard—when a specific track is updated (such as VTOC tracks in CKD volumes), or when a specific track is updated and the write pattern is not applicable.

Stage 130 includes participating in generating a condition fulfillment point in time version of the multiple information items. Stage 130 can include applying an incremental snapshot technique in which only information items that were changes after the last snap-shot was generated are copied from a source memory entity to a target memory entity.

Stage 130 can include applying a non-incremental snapshot technique in which all the information items (of the multiple information items) are copied to the target memory entity.

Stage 130 can include copying at least one information item, controlling the copying of at least one information item, triggering or initiating the copying of at least one information item.

Stage 130 can be executed by a memory controller but this is not necessarily so. A memory entity can be a storage unit or a memory unit.

A condition fulfillment point in time version of the multiple information items is a version of each of the multiple information items at a condition fulfillment point of time that is associated with a fulfillment of a condition of the conditional request. This can be the point in time that the condition was fulfilled, the point in time in which a memory controller detected that the condition was fulfilled, slightly after the condition was fulfilled, and the like.

Figure 3:
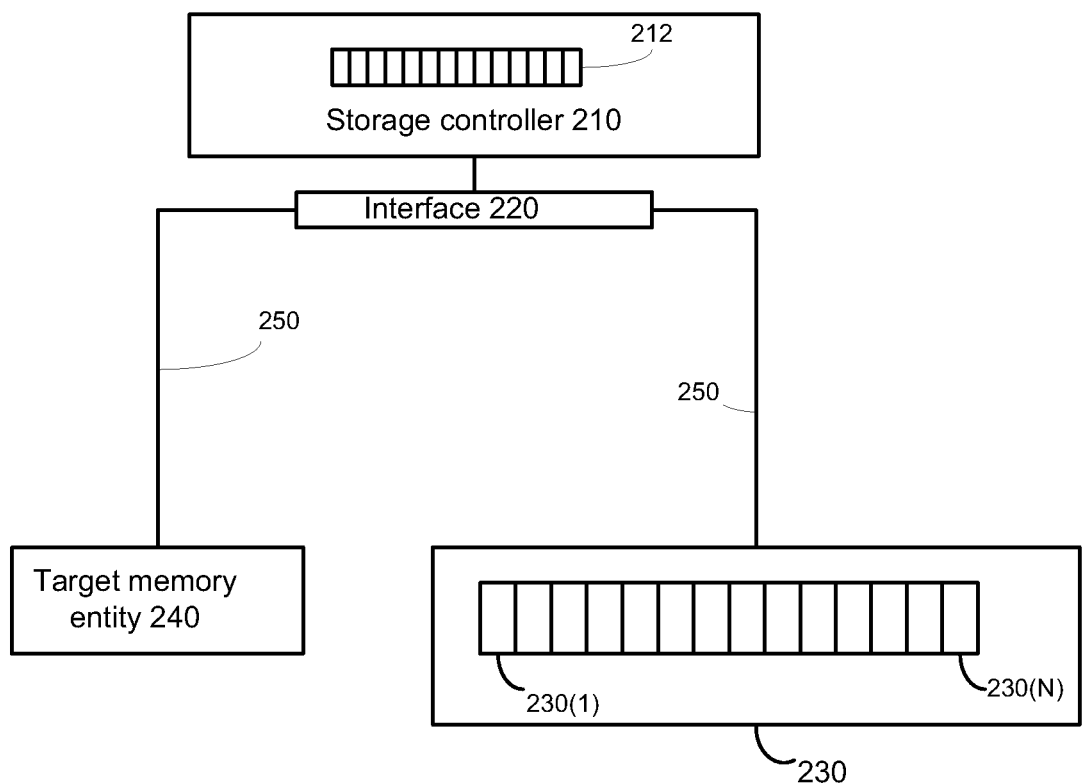
FIG. 3 illustrates a system according to an embodiment of the invention.

FIG. 3 illustrates storage system 200 according to an embodiment of the invention. Storage system 200 includes storage controller 210, interface 220, source memory entity 230, target memory entity 240 and communication channels 250 that are connected between source memory entity 230, target memory entity 240 and storage controller 210. These communication channels can be a network, can be a part of a storage are network, and the like.

Interface 220 is adapted to receive a conditional request to copy a version of multiple information items at a condition fulfillment point of time that is associated with a fulfillment of a condition of the conditional request. The conditional request can be generated by a user or by a system administrator and can be sent from another computer.

Interface 220 can include input ports, output ports, I/O ports, memory units and the like.

Storage controller 210 can receive information from various entities such as a user computer, an administrator computer, one or more sensors, another storage controller, a backup system, the target memory entity and the source memory entity.

Storage controller 210 can apply method 100 or any stage (or stages) of method 100. It can, for example, determine whether the condition is fulfilled. If the condition is fulfilled then storage controller 210 can participate in generating a condition fulfillment point in time version of the multiple information items. It is noted that the fulfillment of the condition can be determined by one or more other entities that differ from the storage controller and that the storage controller can receive an indication that a condition has been fulfilled from such another entity. For example, another entity (for example another computer, software executed by another computer) can receive information from the storage controller and process it to determine that a condition is fulfilled).

The storage controller is adapted to determine that the condition is fulfilled if any of the following occur, or a combination thereof: (i) when the storage controller receives a request to write to a memory space that stores an information item, out of the multiple information items, that was read after receiving the conditional request, (ii) when receiving an application coherency indication, (iii) when detecting a potential hazard, (iv) when a memory entity selected from the source memory entity and the target memory entity is capable of participating in generating the condition fulfillment point in time version of the multiple information items, (v) in response to a load of a component that participates in a generation of a condition fulfillment point in time version of the multiple information items, (vi) in response to a cost associated with a generation of a condition fulfillment point in time version of the multiple information items, or (vii) in response to a value of at least one parameter that is detected by the storage controller or received by the storage controller.

Referring to the example set fourth in FIG. 2, it is assumed that communication controller 210 maintains a read bit map 212 that indicates which information item (identified by the storage space that stores it) was read after receiving the conditional request.

A conditional request is received at point in time TIME.

Immediately after TIME bit map 212 is reset—bits 212(1)-212(N) (that correspond to N memory spaces) are reset.

At T1, after TIME, the track 230(N) (the N'th track of source memory entity 230) is written by information item A. This will not trigger a generation of condition fulfillment snap shot.

At T2, after T1, track 230(N) is read. This sets bit 212(N).

At T3, after T2, a request to write information item B to track 230(N) is received. Communication controller 210 detects that a write request to track 230(N) was received and that track 230(N) was read at T2 and determines that the condition has been fulfilled. Accordingly, T3 (also referred to as TIME+DELTA) is the condition fulfillment point in time. Communication controller 210 controls a generation of a condition fulfillment snap shot and the versions of information items that were stored in tracks 230(1)-230(N) are copied to target memory entity 240. A copy of track 230(N) is copied to target memory entity 240 before information item B is written to 230(N). It is noted that other tracks out of tracks 230(1)-230(N) can be copied when the condition is fulfilled, can be copied, during an incremental snap shot, only if changed after a previous version was copied to the target memory entity, or when receiving a later requests to write to them. Accordingly, not all information items stored in tracks 230(1)-230(N) must be copied immediately after TIME+DELTA.

Furthermore, the invention can take the form of a computer program product accessible from a tangible computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device.

The tangible medium can be read by applying electronic, magnetic, optical, electromagnetic, infrared techniques, and can be a semiconductor system (or apparatus or device). Examples of a tangible computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk—read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

A computer program product is provided. It includes a tangible computer usable medium including a computer readable program, wherein the computer readable program when executed on a computer (such as but not limited to the storage controller) causes the computer to: receive a conditional request to copy a version of multiple information items at a condition fulfillment point of time that is associated with a fulfillment of a condition of the conditional request; determine that the condition is fulfilled; and participate in generating a condition fulfillment point in time version of the multiple information items.

The tangible computer usable medium includes a computer readable program, wherein the computer readable program when executed on a computer (such as but not limited to the storage controller) causes the computer to execute any stage of method 100 and any combination thereof.

Those skilled in the art will appreciate that various adaptations and modifications of the just-described preferred embodiments can be configured without departing from the scope and spirit of the invention. Therefore, it is to be understood that, within the scope of the appended claims, the invention may be practiced other than as specifically described herein.

What is claimed is:

1. A method for generating a conditionally consistent version of multiple information items, the method comprising:
   receiving, using a hardware processor of a storage controller, a conditional request to copy a version of multiple information items at a condition fulfillment point of time that is determined upon fulfillment of two or more conditions, wherein the conditional request comprises the two or more conditions and indication of memory spaces that store the multiple information items;
   setting a bit-map after receiving the conditional request that includes a representation of all of the multiple information items;
   monitoring read requests and/or write requests for the multiple information items after receiving the conditional request;
   delaying generation of a point in time version of the multiple information items until fulfillment of the two or more conditions for relaxing timing constraints on generation of the point in time version of the multiple information items;

determining, using the hardware processor of the storage controller, that all of the two or more conditions are fulfilled;

determining the condition fulfillment point of time, wherein the condition fulfillment point in time is set at a time when the two or more conditions are fulfilled or after the two or more conditions are fulfilled;

updating the bit-map to reflect which of the multiple information items have been read since receiving the conditional request; and participating in generating a condition fulfillment point in time version of the multiple information items at the condition fulfillment point of time.

2. The method according to claim 1 wherein one of the two or more conditions is a memory space coherency check condition, wherein the memory space coherency check condition is fulfilled upon receiving a request to write to a memory space that stores an information item, out of the multiple information items, that was read after receiving the conditional request.

3. The method according to claim 1 wherein one of the two or more conditions is an application coherency condition, wherein the application coherency condition is fulfilled upon receiving an application coherency indication.

4. The method according to claim 1 wherein one of the two or more conditions is a hazard condition, wherein the hazard condition is fulfilled upon detecting a potential hazard, the potential hazard being an update to a specific track and/or a write pattern that is not applicable on an updated track.

5. The method according to claim 1 further comprising:
monitoring availability of a memory entity selected from a source memory entity and a target memory entity;
wherein one of the conditions is a memory entity availability check condition, wherein the memory entity availability check condition is fulfilled upon the memory entity being capable of participating in generating the condition fulfillment point in time version of the multiple information items,
wherein being able to participate includes being available and not in use.

6. The method according to claim 1 further comprising:
wherein one of the conditions is a component load check condition, wherein the component load check condition is fulfilled in response to a load of a component being below a threshold, wherein the component participates in generation of the condition fulfillment point in time version of the multiple information items.

7. The method according to claim 1 wherein one of the two or more conditions is a cost check condition, wherein the cost check condition is fulfilled in response to a cost being below a threshold, the cost being associated with generation of the condition fulfillment point in time version of the multiple information items.

8. The method according to claim 1
wherein one of the two or more conditions is a performance parameter check condition, wherein the performance parameter check condition is fulfilled in response to a value of at least one performance parameter being at or beyond a predefined value, wherein the at least one performance parameter is detected by the storage controller or received by the storage controller; and
the method further comprising controlling, by the storage controller, the generation of the condition fulfillment point in time version of the multiple information items at the condition fulfillment point in time upon determining that all the conditions are fulfilled.

9. A storage system, comprising:
an interface configured to receive a conditional request to copy a version of multiple information items at a condition fulfillment point of time that is associated with fulfillment of at least one condition, wherein the at least one condition and indication of memory spaces that store the multiple information items is included in the conditional request; and
a storage controller coupled to a source memory storage entity, to the interface, and to a target memory storage entity,
wherein the storage controller is configured to participate in generating a condition fulfillment point in time version of the multiple information items at the condition fulfillment point in time which occurs upon or after the storage controller determining that the at least one condition is fulfilled,
wherein the storage controller is configured to set a bit-map after the conditional request is received, the bit-map including a representation of all of the multiple information items, and configured to update the bit-map to reflect which of the multiple information items have been read since the conditional request was received, and
wherein the at least one condition is selected from a group comprising:
receiving a request to write to a memory space that stores an information item, out of the multiple information items, that was read after receiving the conditional request;
receiving an application coherency indication;
detecting a potential hazard; and
determining that a memory storage entity selected from the source memory storage entity and the target memory storage entity is capable of participating in generating the condition fulfillment point in time version of the multiple information items,
wherein being able to participate includes being available and not in use.

10. The storage system according to claim 9:
wherein the storage controller is further configured to monitor read requests and/or write requests for the multiple information items after receiving the conditional request,
wherein monitoring the read requests includes monitoring read requests that were directed to the target memory storage entity and re-directed to the source memory storage entity, and monitoring the write requests includes monitoring write requests directed to the source memory storage entity,
wherein the at least one condition further includes at least one of: a load on the target memory storage entity being below a first threshold, and a load on the source memory storage entity being below a second threshold, and
wherein participating in generating the condition fulfillment point in time version of the multiple information items includes copying from the source memory storage entity to the target memory storage entity only information items that were changed after a last snapshot was generated.

11. The storage system according to claim 9 wherein the group from which the at least one condition is selected further includes:
detecting that a load of a component is below a load threshold, wherein the component participates in generation of the condition fulfillment point in time version of the multiple information items; and/or detecting that a cost is below a cost threshold, the cost being associated with generation of the condition fulfillment point in time version of the multiple information items.

12. The storage system according to claim 9 wherein at least two conditions are selected, wherein the group from which the at least one condition is selected further includes: a performance parameter check condition, a component load check condition, a cost check condition, and a memory entity availability check condition, wherein the performance parameter check condition is fulfilled in response to detecting that a value of at least one performance parameter is at or beyond a predefined value, wherein the at least one performance parameter is detected by the storage controller or received by the storage controller, wherein the component load check condition is fulfilled in response to detecting that a load of a component is below a load threshold, wherein the component participates in generation of the condition fulfillment point in time version of the multiple information items, wherein the cost check condition is fulfilled in response to detecting that a cost is below a cost threshold, the cost being associated with generation of the condition fulfillment point in time version of the multiple information items, wherein the memory entity availability check condition is fulfilled upon detecting that a memory entity selected from a source memory entity and a target memory entity is capable of participating in generating the condition fulfillment point in time version of the multiple information items, wherein being able to participate includes being available and not in use.

13. A computer program product comprising a computer readable storage medium including a computer readable program, wherein the computer readable program when executed on a computer causes the computer to:

receive a conditional request to copy a version of multiple information items at a condition fulfillment point of time that is determined upon fulfillment of at least two conditions, wherein the conditional request comprises the at least two conditions and indication of memory spaces that store the multiple information items, wherein fulfillment of a first condition triggers a start of a time window during which a second condition must be fulfilled in order to cause generation of a condition fulfillment point in time version of the multiple information items;

set a bit-map after receiving the conditional request that includes a representation of all of the multiple information items;

update the bit-map to reflect which of the multiple information items have been read since receiving the conditional request;

determine that the first condition is fulfilled and start the time window;

in response to determining that the time window is started, monitor the second condition for fulfillment;

while monitoring the second condition for fulfillment, determine that the second condition is fulfilled within the time window before the time window ends; and in response to determining that the second condition is fulfilled, participate in generating the condition fulfillment point in time version of the multiple information items, wherein the condition fulfillment point in time is set at a time when the at least two conditions are fulfilled or after the at least two conditions are fulfilled.

14. The computer program product according to claim 13, wherein one of the at least two conditions is a memory space coherency check condition, wherein the memory space coherency check condition is fulfilled upon receiving a request to write to a memory space that stores an information item, out of the multiple information items, that was read after receiving the conditional request.

15. The computer program product according to claim 13, wherein one of the at least two conditions is an application coherency condition, wherein the application coherency condition is fulfilled upon receiving an application coherency indication.

16. The computer program product according to claim 13, wherein one of the at least two conditions is a hazard condition, wherein the hazard condition is fulfilled upon detecting a potential hazard, wherein one potential hazard includes an update to a specific track and/or a write pattern that is not applicable on an updated track.

17. The computer program product according to claim 13, wherein one of the at least two conditions is a memory entity availability check condition, wherein the memory entity availability check condition is fulfilled upon a memory entity selected from a source memory entity and a target memory entity being capable of participating in generating the condition fulfillment point in time version of the multiple information items, wherein being able to participate includes being available and not in use.

18. The computer program product according to claim 13, wherein the at least two conditions comprise a component load check condition and a cost check condition, wherein the component load check condition is fulfilled in response to a load of a component being below a load threshold, wherein the component participates in generation of the condition fulfillment point in time version of the multiple information items, and wherein the cost check condition is fulfilled in response to a cost being below a cost threshold, the cost being associated with generation of the condition fulfillment point in time version of the multiple information items.

19. The computer program product according to claim 13, wherein the at least two conditions comprise at least two of: a performance parameter check condition, a component load check condition, a cost check condition, and a memory entity availability check condition, wherein the performance parameter check condition is fulfilled in response to a value of at least one performance parameter being at or beyond a predefined value, wherein the at least one performance parameter is detected by the storage controller or received by the storage controller, wherein the component load check condition is fulfilled in response to a load of a component being below a load threshold, wherein the component participates in generation of the condition fulfillment point in time version of the multiple information items, wherein the cost check condition is fulfilled in response to a cost being below a cost threshold, the cost being associated with generation of the condition fulfillment point in time version of the multiple information items, wherein the memory entity availability check condition is fulfilled upon a memory entity selected from a source memory entity and a target memory entity being capable of participating in generating the condition fulfillment point in time version of the multiple information items, wherein being able to participate includes being available and not in use.

* * * * *